United States Patent
Kamada et al.

(10) Patent No.: US 9,784,190 B2
(45) Date of Patent: Oct. 10, 2017

(54) INTERNAL COMBUSTION ENGINE CONTROL DEVICE AND CONTROL METHOD

(71) Applicant: NISSAN MOTOR CO., LTD., Yokohama-shi, Kanagawa (JP)

(72) Inventors: Shinobu Kamada, Kawasaki (JP); Taisuke Ikari, Hiratsuka (JP); Sho Ohtsu, Zama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/785,797

(22) PCT Filed: Mar. 26, 2014

(86) PCT No.: PCT/JP2014/058406
§ 371 (c)(1),
(2) Date: Oct. 20, 2015

(87) PCT Pub. No.: WO2014/174969
PCT Pub. Date: Oct. 30, 2014

(65) Prior Publication Data
US 2016/0076465 A1 Mar. 17, 2016

(30) Foreign Application Priority Data
Apr. 23, 2013 (JP) ................................. 2013-090059

(51) Int. Cl.
*F02D 15/02* (2006.01)
*F02D 41/14* (2006.01)

(52) U.S. Cl.
CPC ...... *F02D 15/02* (2013.01); *F02D 2041/1412* (2013.01); *F02D 2200/0402* (2013.01); *F02D 2200/0408* (2013.01)

(58) Field of Classification Search
CPC .............. F02D 2041/001; F02D 15/02; F02D 41/0002; F02D 41/1401; F02D 41/2416;
(Continued)

(56) References Cited

U.S. PATENT DOCUMENTS 7,159,543 B2 * 1/2007 Hotta ...................... F02D 15/02
123/48 B
7,643,930 B2 * 1/2010 Yasui .................. F01L 13/0021
123/90.15
(Continued)

FOREIGN PATENT DOCUMENTS

JP 11-062673 A 3/1999
JP 2004-211590 A 7/2004
(Continued)

OTHER PUBLICATIONS

Machine Translation of JP 2012-057514, see "JP2012057514_MachineTranslation.pdf".*

*Primary Examiner* — Hai Huynh
*Assistant Examiner* — Long T Tran
(74) *Attorney, Agent, or Firm* — Foley & Lardner LLP (57) ABSTRACT

A target compression ratio ε(t+Tact) after a prescribed time Tact has expired from a current point of time is calculated from an intake air volume drawn into a cylinder after expiration of the prescribed time Tact from the current point of time. A control command to an electric motor that drives a variable compression ratio mechanism is calculated so as to bring an actual compression ratio εr(t+Tact) after the prescribed time Tact into accordance with the target compression ratio ε(t+Tact) after the prescribed time Tact. This enables the actual compression ratio to follow the target compression ratio accurately.

9 Claims, 12 Drawing Sheets (58) Field of Classification Search
CPC ............ F02D 41/2422; F02D 13/0226; F02D 13/0223; F02D 2700/03; F02B 75/048
USPC ................... 123/48 AA, 48 R, 78 AA, 78 R; 701/101–104
See application file for complete search history.

(56) References Cited

U.S. PATENT DOCUMENTS

| | | | | |
|---|---|---|---|---|
| 7,661,407 | B2* | 2/2010 | Yasui | F02B 75/048 123/406.35 |
| 7,669,559 | B2* | 3/2010 | Aoyama | F02D 13/023 123/48 B |
| 8,627,789 | B2* | 1/2014 | Hiraya | F02D 15/02 123/179.16 |
| 2008/0087255 | A1* | 4/2008 | Aoyama | F02D 13/023 123/48 B |
| 2009/0055081 | A1* | 2/2009 | Yasui | F02B 75/048 701/103 |
| 2011/0005496 | A1* | 1/2011 | Hiraya | F02D 15/02 123/48 B |
| 2013/0055989 | A1 | 3/2013 | Kawasaki | |
| 2013/0213035 | A1* | 8/2013 | Kamiyama | F02B 75/041 60/602 |

FOREIGN PATENT DOCUMENTS

| | | |
|---|---|---|
| JP | 2005-155507 A | 6/2005 |
| JP | 2005-163739 A | 6/2005 |
| JP | 2006-183604 A | 7/2006 |
| JP | 2012-57514 A | 3/2012 |
| JP | 2012-117474 A | 6/2012 |
| JP | 2012-241623 A | 12/2012 |

* cited by examiner

INTERNAL COMBUSTION ENGINE CONTROL DEVICE AND CONTROL METHOD

TECHNICAL FIELD

The present invention relates to an internal combustion engine control device and a control method for an internal combustion engine.

BACKGROUND ART

On internal combustion engines configured to change an engine compression ratio, the engine compression ratio is controlled to a relatively high compression ratio during low load operation and also controlled to a relatively low compression ratio during high load operation. Therefore, when the operating condition changes from a low-load operating condition to a high-load operating condition, for example, during an accelerating condition, the engine compression ratio is reduced in accordance with an increase in load. Assuming that an actual compression ratio becomes higher than a target compression ratio due to a response delay of the engine compression ratio when reducing the engine compression ratio in accordance with a change in the operating condition in the foregoing manner, knocking may possibly occur.

For instance, Patent document 1 discloses an internal combustion engine control device configured to calculate a second target compression ratio by performing phase-lead processing, in which a response delay of the compression ratio caused by a variable compression ratio mechanism is taken into account, with respect to a first target compression ratio calculated from a current engine load (intake air quantity), and to control the compression ratio closer to the second target compression ratio.

In this Patent document 1, in the case that the responsiveness of a compression ratio varied by a variable compression ratio mechanism is superior to the responsiveness of an intake air quantity, the superior responsiveness of the compression ratio permits the second target compression ratio to be calculated. Therefore, it is possible to bring the actual compression ratio sufficiently closer to the first target compression ratio corresponding to an original compression ratio.

However, conversely in the case that the responsiveness of an intake air quantity is superior to the responsiveness of a compression ratio varied by the variable compression ratio mechanism, there is a possibility that the second target compression ratio cannot follow the first target compression ratio.

CITATION LIST

Patent Literature

Patent document 1: Japanese Patent Provisional Publication No. JP2005-163739

SUMMARY OF INVENTION

It is, therefore, in view of the above, the internal combustion engine control device of the invention is characterized by a predicted intake air volume calculation means for calculating, based on an engine load of the internal combustion engine, a predicted intake air volume after a prescribed time has expired from a current point of time, a target compression ratio calculation means for calculating, based on the predicted intake air volume calculated by the predicted intake air volume calculation means, a target compression ratio after expiration of the prescribed time from the current point of time, and a control command calculation means for calculating a control command to a variable compression ratio mechanism so as to bring an actual compression ratio into accordance with the target compression ratio.

According to the invention, even when the transient responsiveness of an intake air volume is superior to the transient responsiveness of a compression ratio, it is possible to make the actual compression ratio to follow the target compression ratio accurately.

BRIEF DESCRIPTION OF DRAWINGS

FIG. 3 is an explanatory view schematically illustrating the link attitude of the variable compression ratio mechanism, and FIG. 3A shows a high compression ratio position, whereas

DESCRIPTION OF EMBODIMENTS

One embodiment of the present invention is hereinafter described in detail with reference to the drawings. First of all, the fundamental configuration of an internal combustion engine 1, to which the invention is applied, is explained by the use of FIG. 1. Internal combustion engine 1 is mounted on a vehicle as a driving source, and equipped with an intake-valve side valve operating mechanism 4 which drives an intake valve 2, an exhaust-valve side valve operating mechanism 5 which drives an exhaust valve 3, and a variable compression ratio mechanism 9 configured to change an engine compression ratio by changing a top dead center (TDC) position of a piston 8 which reciprocates in a cylinder 7 of a cylinder block 6.

Figure 1:
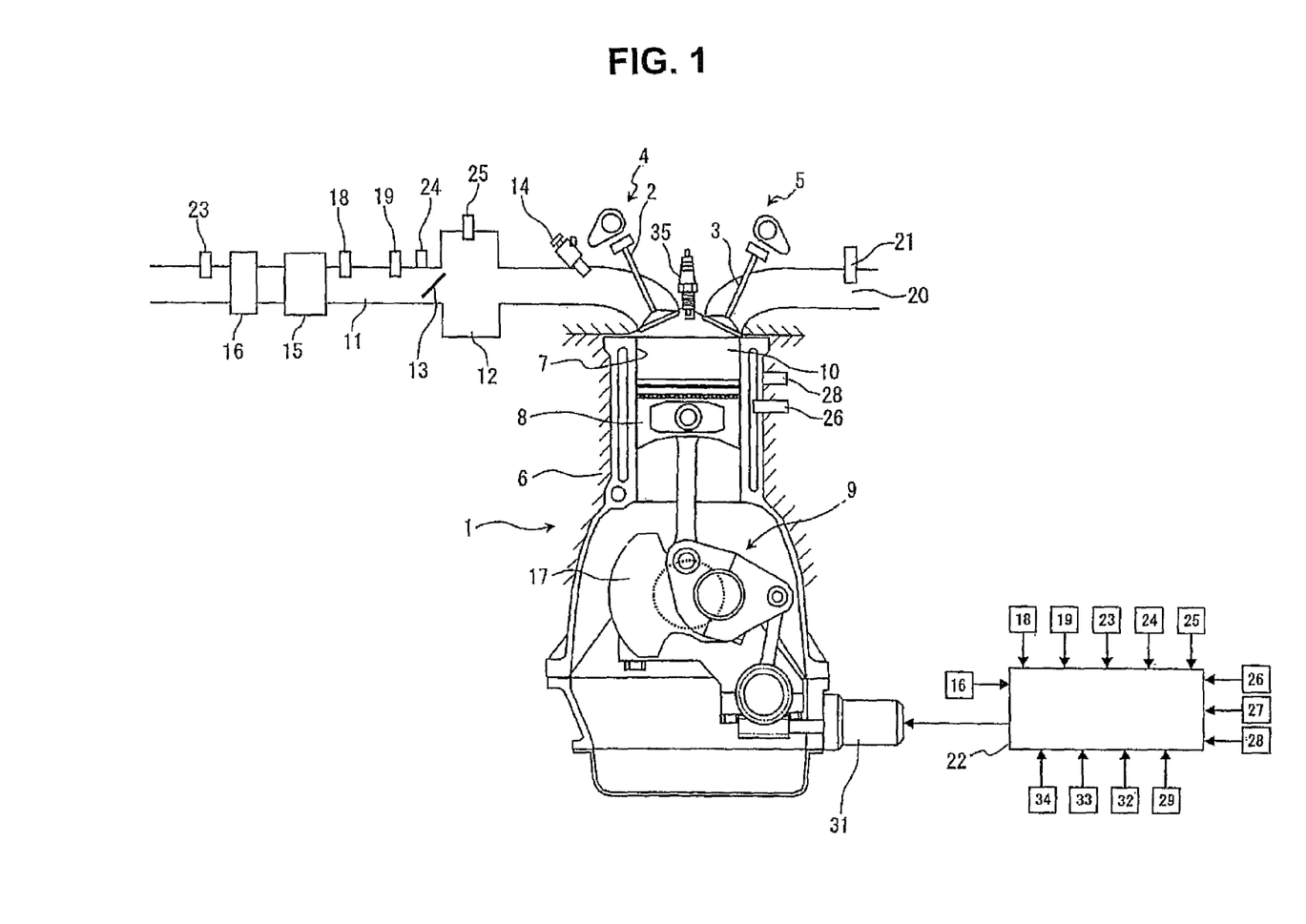
FIG. 1 is an explanatory view schematically illustrating the system configuration of an internal combustion engine control device of the invention.

For instance, each of intake-valve side valve operating mechanism 4 and exhaust-valve side valve operating mechanism 5 is a conventional direct-acting valve operating mechanism. The working angle and the phase of a lift central angle of each of intake valve 2 and exhaust valve 3 are always kept constant.

Provided in an intake passage 11 connected through the intake valve 2 to a combustion chamber 10 are a throttle valve 13 for adjusting an intake air quantity (intake air volume) by opening and closing the upstream side of an intake air collector 12 and a fuel injection valve 14 located downstream of the intake air collector 12 for injecting fuel. Throttle valve 13 is an electronically-controlled throttle whose valve-opening can be adjusted independently of operation (depression) of an accelerator pedal by the driver. The throttle valve is driven by means of an actuator (not shown).

Also provided in the intake passage 11 are a supercharger 15 and an airflow meter 16, both located upstream of the throttle valve 13.

Supercharger 15 is configured to pressurize intake air and to feed the pressurized intake air into the combustion chamber 10 of internal combustion engine 1. For instance, a mechanical supercharger (simply, a supercharger) which is driven by a crankshaft 17 of internal combustion engine 1 or an exhaust gas turbine supercharger (simply, a turbocharger) is applied. Airflow meter 16 is located upstream of the supercharger 15.

Further provided in the intake passage 11 are an intake air pressure sensor 18 for detecting the intake air pressure and an intake air temperature sensor 19 for detecting the intake air temperature, both located between the throttle valve 13 and the supercharger 15.

Provided in an exhaust passage 20 connected through the exhaust valve 3 to the combustion chamber 10 is an air/fuel ratio sensor 21 for detecting an exhaust air-fuel ratio.

An engine control unit (ECU) 22 is a generally-known digital computer equipped with a central processing unit (CPU), a read only memory (ROM), a random access memory (RAM), and an input-output (I/O) interface. The ECU receives various signals, such as an atmospheric pressure sensor signal from an atmospheric pressure sensor 23 for detecting atmospheric pressure, a throttle sensor signal (TVO(t)) from a throttle sensor 24 for detecting an opening degree of throttle valve 13, an in-collector pressure sensor signal from an in-collector pressure sensor 25 for detecting a pressure in intake air collector 12, a water temperature sensor signal (Tw(t)) from a water temperature sensor 26 for detecting a coolant temperature of internal combustion engine 1, a crankangle sensor signal (Ne(t)) from a crankangle sensor 27 for detecting an engine revolution speed, a knock sensor signal from a knock sensor 28 for detecting the presence or absence of knocking, an accelerator opening signal (APO(t)) from an accelerator opening sensor 29 for detecting a depression amount of an accelerator pedal corresponding to a load (a required load required by the driver), an electric motor rotation angle sensor signal from an electric motor rotation angle sensor 32 for detecting a rotation angle of an electric motor 31 configured to drive the variable compression ratio mechanism 8, an electric motor temperature sensor signal (Tmo(t)) from an electric motor temperature sensor 33 for detecting a temperature of electric motor 31, and a source voltage sensor signal (VB(t)) from a source voltage sensor 34 for detecting a source voltage of electric motor 31 and the like, in addition to a detection signal from the airflow meter 16, a detection signal (Boost (t)) from the intake air pressure sensor 18, a detection signal (Tm(t)) from the intake air temperature sensor 19. By the way, an actual compression ratio $\epsilon r(t)$ corresponding the current engine compression ratio caused by the variable compression ratio mechanism 9 can be determined by the rotation angle of electric motor 31 detected by the electric motor rotation angle sensor 32.

Then, ECU 22 outputs control signals determined based on these input signals to the fuel injection valve 14, an ignition plug 35 for igniting an air-fuel mixture in the combustion chamber 10, the throttle valve 13, the variable compression ratio mechanism 9 and the like, respectively, for integrally controlling the fuel injection amount, fuel injection timing, ignition timing, and throttle opening, engine compression ratio and the like.

Figure 2:
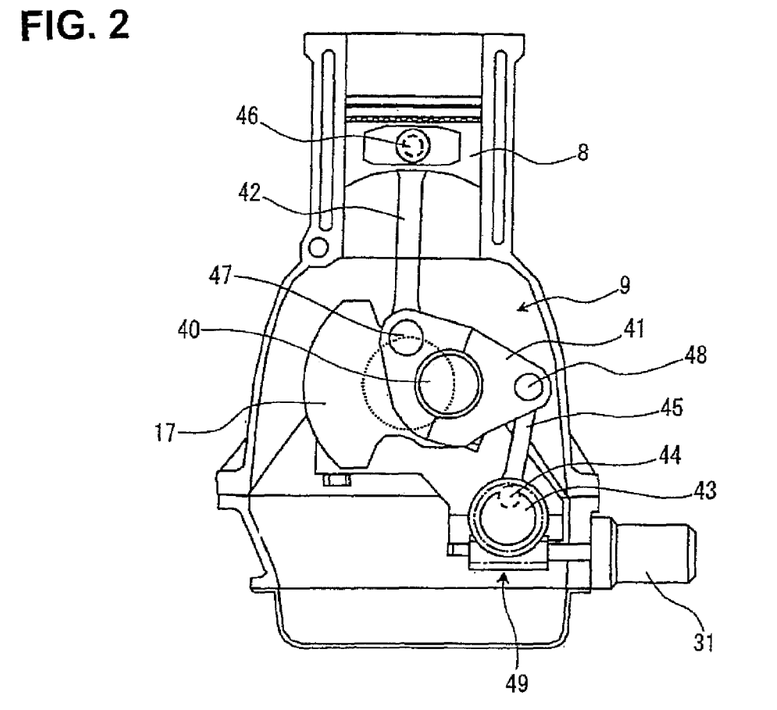
FIG. 2 is an explanatory view schematically illustrating a variable compression ratio mechanism which is applied to the internal combustion engine control device of the invention.
Figure 3A:
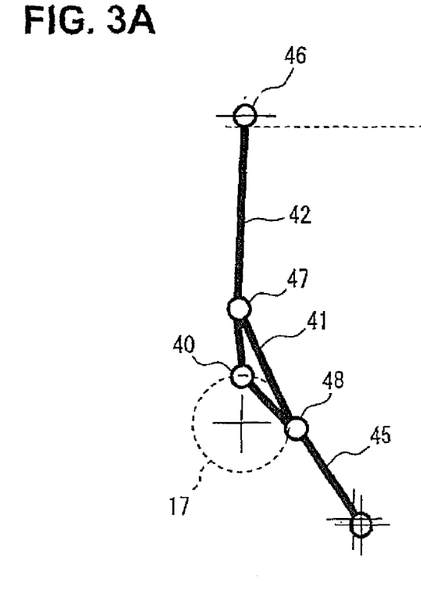
Figure 3B:
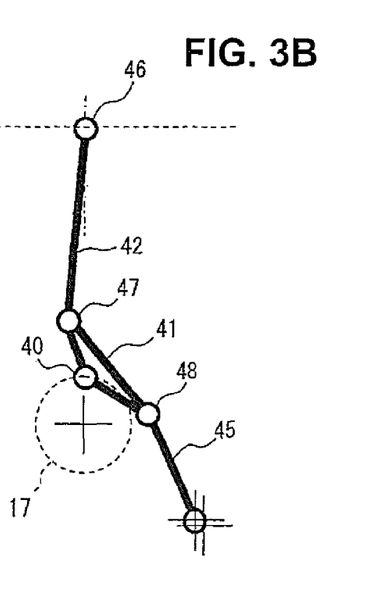
FIG. 3B shows a low compression ratio position.

As shown in FIGS. 2-3, variable compression ratio mechanism 9 utilizes a multi-link piston-crank mechanism in which the piston 8 and a crankpin 40 of crankshaft 17 are mechanically linked to each other through a plurality of links. The variable compression ratio mechanism has a lower link 41 rotatably installed on the crankpin 40, an upper link 42 through which the lower link 41 and the piston 8 are linked to each other, a control shaft 43 equipped with an eccentric shaft portion 44, and a control link 45 through which the eccentric shaft portion 44 and the lower link 41 are linked to each other. One end of upper link 42 is rotatably installed on a piston pin 46, while the other end is rotatably connected to the lower link 41 by means of a first connecting pin 47. One end of control link 45 is rotatably connected to the lower link 41 by means of a second connecting pin 48, while the other end is rotatably installed on the eccentric shaft portion 44.

Control shaft 43 is arranged parallel to the crankshaft 17 and rotatably supported by the cylinder block 6. By the way, control shaft 43 is rotated and driven by the electric motor 31 through a gear mechanism 49, so that the rotational position of the control shaft is controlled.

As shown in FIG. 3, the attitude of lower link 41 is changed via the control link 45 by changing the rotational position of control shaft 43 by means of the electric motor 31. Hence, the engine compression ratio is continuously varied and controlled with a change in the piston motion (stroke characteristic) of piston 8, that is, a change in the top dead center position and a change in the bottom dead center position of piston 8.

Figure 4:
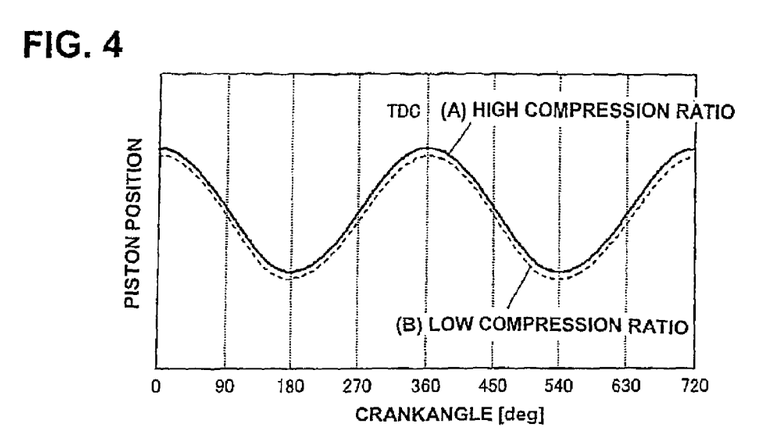
FIG. 4 is a characteristic diagram illustrating a piston motion of the variable compression ratio mechanism.

By virtue of the variable compression ratio mechanism which utilizes the above multi-link piston-crank mechanism, the engine compression ratio can be optimized depending on an engine operating condition. This contributes to the improved fuel economy and enhanced output. Additionally, in the case of such a multi-link piston-crank mechanism, the piston stroke characteristic (see FIG. 4) itself can be optimized closer to a characteristic substantially corresponding to simple harmonic motion, as compared to a single-link mechanism in which a piston and a crankpin are connected to each other through a single link. Also, the piston stroke length with respect to a crankthrow can be enlarged, as compared to a single link mechanism. This contributes to the shortened engine overall height and increased compression ratio. Furthermore, a thrust load acting on the piston 8 or the cylinder 7 can be reduced and appropriately adjusted by optimizing the inclination of upper link 42. This contributes to the light weight of the piston 8 or the cylinder 7.

Figure 5:
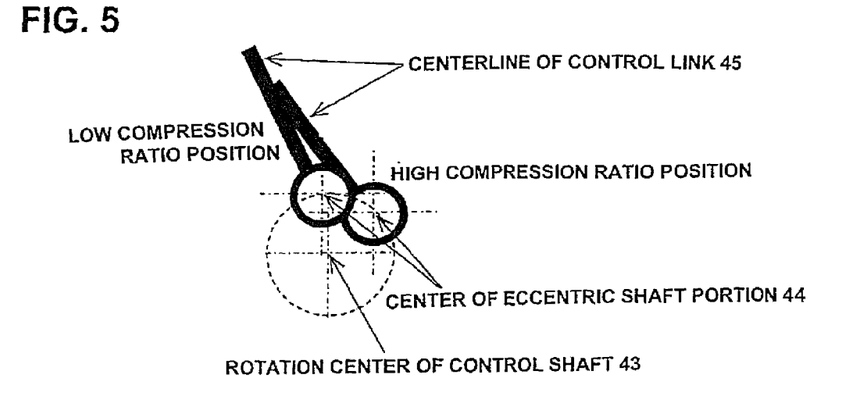
FIG. 5 is an explanatory view schematically illustrating the positional relationship of a control link and a control shaft and the like at the low compression ratio position and the high compression ratio position of the variable compression ratio mechanism.

By the way, as shown in FIG. 5, the variable compression ratio mechanism 9 is configured such that a compression ratio change speed at a high compression ratio is set higher than a compression ratio change speed at a low compression ratio, taking account of knocking which may occur transiently due to a delay of compression-ratio-changing from a high compression ratio to a low compression ratio. Concretely, as compared to setting of the compression ratio change speed at a low compression ratio position, in the case of setting of the compression ratio change speed at a high compression ratio, the angle between the link centerline of control link 45 and the decentering line connecting the rotation center of control shaft 43 and the center of eccentric shaft portion 44 becomes almost a right angle. Therefore, the arm length of a moment is increased and thus the driving moment produced by the electric motor 31 is increased, and as a result the compression ratio change speed is increased.

In the internal combustion engine 1 of the embodiment as discussed above, an intake air volume drawn into the cylinder 7 after a prescribed time Tact, corresponding to a response delay time of variable compression ratio mechanism 9, is predicted, a target compression ratio $\epsilon(t+Tact)$ after expiration of the prescribed time Tact from the current point of time is calculated from the predicted intake air volume, and then the electric motor 31 that drives the variable compression ratio mechanism 9 is controlled so as to bring an actual compression ratio $\epsilon r(t+Tact)$ after the prescribed time Tact into accordance with the target compression ratio $\epsilon(t+Tact)$ after the prescribed time Tact.

Figure 6:
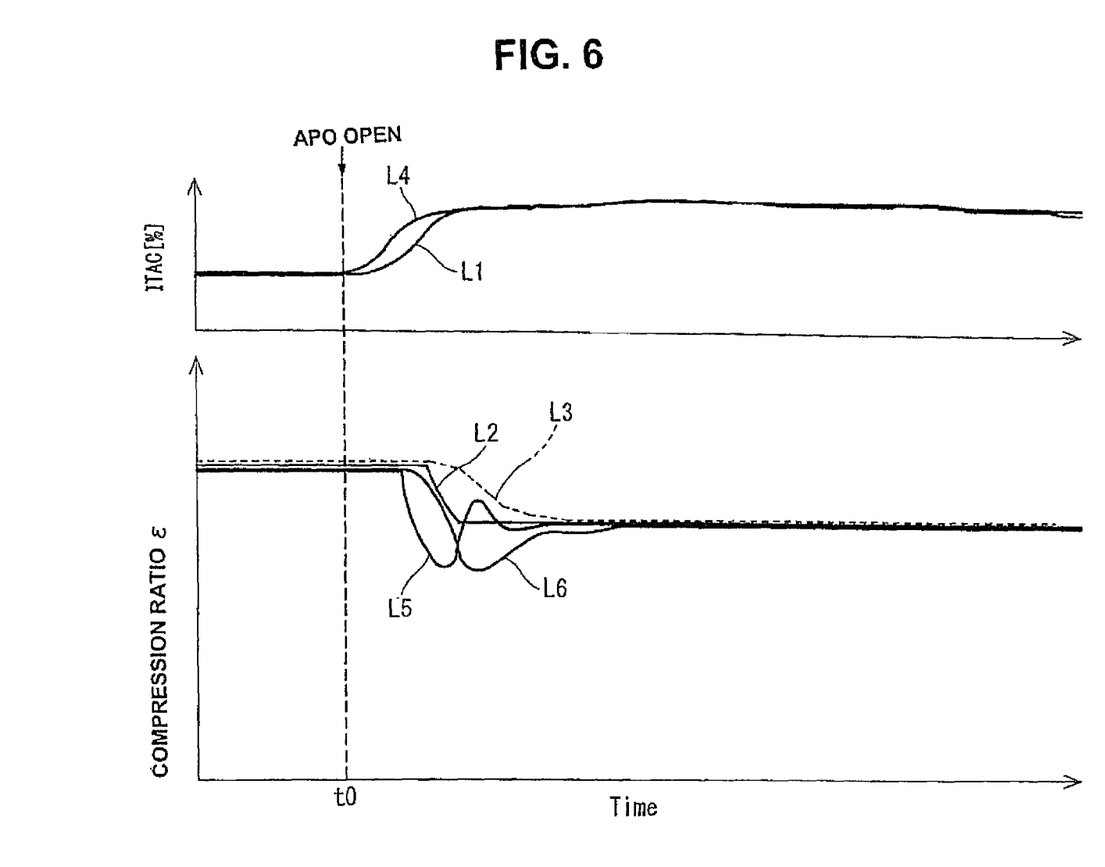
FIG. 6 is a timing chart illustrating a change in charging efficiency and a change in compression ratio during a transient period.

FIG. 6 is the timing chart illustrating a change in charging efficiency and a change in compression ratio during a transient period. At the time t0 when the accelerator pedal is depressed by the driver, the intake air volume increases, and thus the charging efficiency (ITAC) increases as indicated by the characteristic curve L1. Also, with the accelerator pedal depressed by the driver, the operating condition changes from a low load condition to a high load condition and thus a target compression ratio changes as indicated by the characteristic curve L2 owing to a change in the charging efficiency (ITAC). The target compression ratio (i.e., the characteristic curve L2) is set to a value such that abnormal combustion such as knocking, pre-ignition, misfiring and the like can be prevented from occurring.

However, when the aforementioned target compression ratio (the characteristic curve L2) is used as a control command to variable compression ratio mechanism 9 (i.e., a control command to electric motor 31), due to a response delay of variable compression ratio mechanism 9 the transient compression ratio cannot follow the target compression ratio accurately as appreciated from the characteristic curve L3 indicated by the broken line. Thus, knocking may possibly occur.

Therefore, in the internal combustion engine 1 of the embodiment, first of all, an intake air volume drawn into the cylinder 7 after a prescribed time Tact, corresponding to a response delay time of variable compression ratio mechanism 9, is predicted. The characteristic curve L4 of FIG. 6 represents the intake air volume drawn into the cylinder 7 after the prescribed time Tact has expired from the current point of time. Thereafter, a target compression ratio $\epsilon(t+Tact)$ after expiration of the prescribed time Tact from the current point of time is calculated from the predicted intake air volume drawn into the cylinder after expiration of the prescribed time Tact from the current point of time, and then a control command (t) to the electric motor 31 that drives the variable compression ratio mechanism 9 is calculated so as to bring an actual compression ratio $\epsilon r(t+Tact)$ after the prescribed time Tact into accordance with the target compression ratio $\epsilon(t+Tact)$ after the prescribed time Tact. The characteristic curve L5 of FIG. 6 corresponds to a control command (t) to the electric motor 31, which command is converted into a compression ratio.

When electric motor 31 is controlled based on the control command (t) indicated by the characteristic curve L5, the actual compression ratio changes as indicated by the characteristic curve L6 of FIG. 6. Hence, even in the case that the transient responsiveness of an intake air volume is superior to the transient responsiveness of a compression ratio due to a response delay of the compression ratio during the transient period, the actual compression ratio (the characteristic curve L6) does not exceed the target compression ratio (the characteristic curve L2). Thus, it is possible to make the actual compression ratio (the characteristic curve L6) to follow the target compression ratio (the characteristic curve L2) accurately. Additionally, by virtue of the enhanced control accuracy of the compression ratio, it is possible to prevent knocking from occurring during a transient period.

Figure 7:
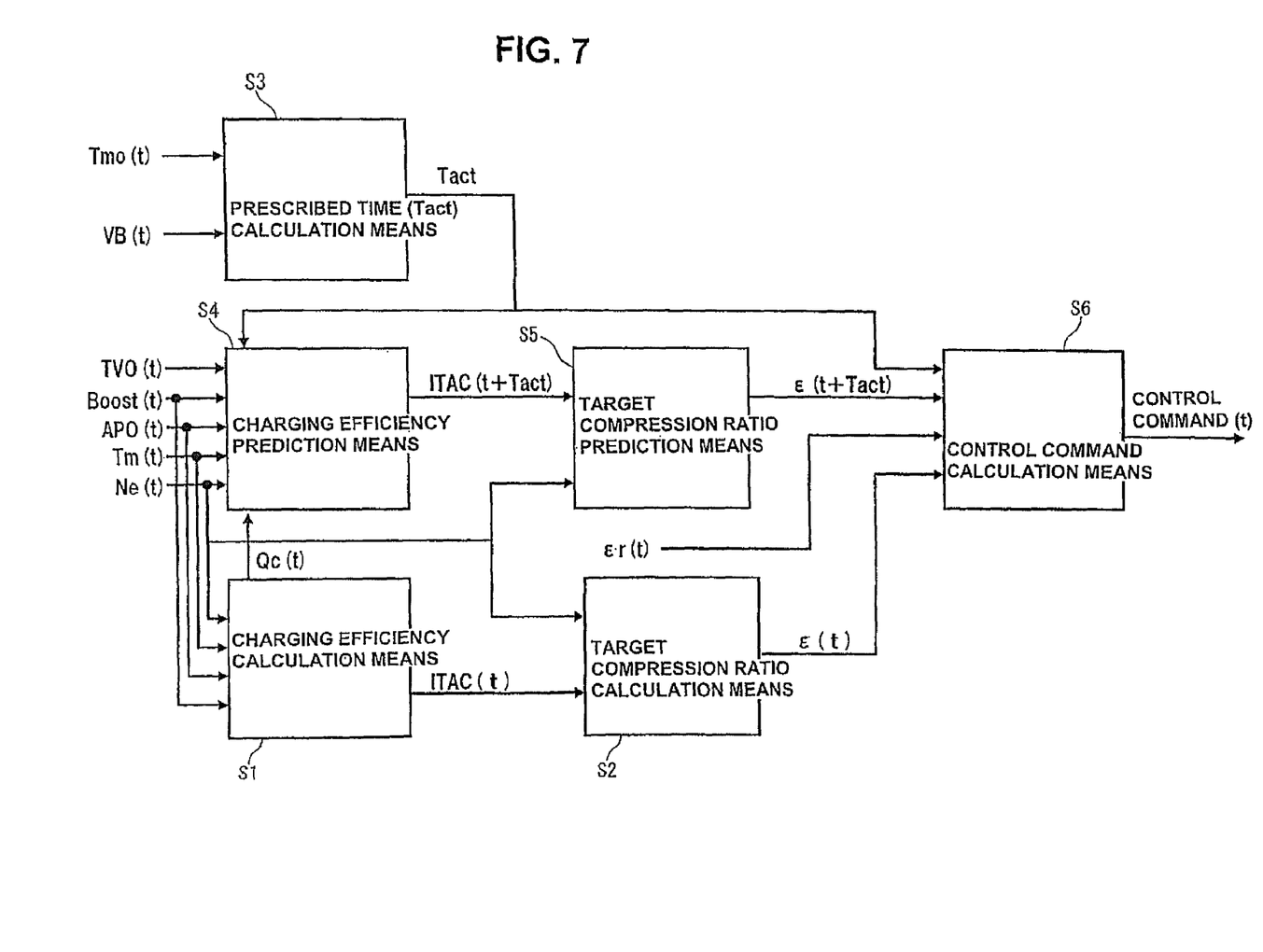
FIG. 7 is a block diagram schematically illustrating the control flow for the variable compression ratio mechanism.

FIG. 7 is the block diagram schematically illustrating the control flow for the variable compression ratio mechanism 9.

Step S1 denotes a charging efficiency calculation means (detailed later) for calculating a current charging efficiency ITAC(t) and a current intake air volume Qc(t) drawn into the cylinder 7, based on the intake air pressure Boost(t) detected by the intake air pressure sensor 18, the accelerator opening APO(t) detected by the accelerator opening sensor 29, the intake air temperature Tm(t) detected by the intake air temperature sensor 19, and the engine revolution speed Ne(t) detected by the crankangle sensor 27.

Figure 8:
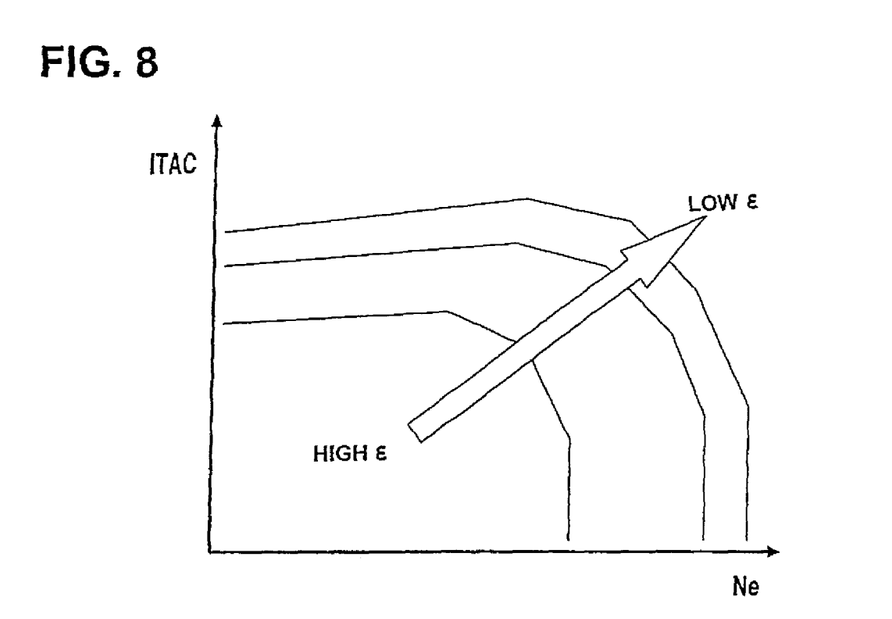
FIG. 8 is a target compression ratio calculation map.

Step S2 denotes a target compression ratio calculation means (detailed later) for calculating a target compression ratio $\epsilon(t)$, based on the charging efficiency ITAC(t) calculated at step S1 and the engine revolution speed Ne(t) detected by the crankangle sensor 27. The target compression ratio $\epsilon(t)$ is set to become lower, as the operating condition shifts to higher load or higher speed, by the use of the target compression ratio calculation map as shown in FIG. 8 for instance.

Step S3 denotes a prescribed time calculation means (detailed later) for calculating a prescribed time Tact, based on the electric motor temperature Tmo(t) detected by the electric motor temperature sensor 33 and the source voltage VB(t) detected by the source voltage sensor 34. The prescribed time Tact is a time corresponding to a response delay time of variable compression ratio mechanism 9. For instance, the prescribed time is a time length such as approximately 200 milliseconds. By the way, the prescribed time Tact may be set to a time longer than a response delay time of variable compression ratio mechanism 9.

Step S4 denotes a charging efficiency prediction means (detailed later) for calculating a predicted charging efficiency ITAC(t+Tact) after expiration of the prescribed time Tact from the current point of time, based on the intake air pressure Boost(t), the accelerator opening APO(t), the intake air temperature Tm(t), the engine revolution speed Ne(t), the throttle opening TVO(t), the intake air volume Qc(t) calculated at step S1, and the prescribed time Tact calculated at step S3.

Step S5 denotes a target compression ratio prediction means (detailed later) for calculating a predicted target compression ratio $\epsilon(t+Tact)$ after the prescribed time Tact, based on the predicted charging efficiency ITAC(t+Tact) calculated at step S4 and the engine revolution speed Ne(t). The predicted target compression ratio $\epsilon(t+Tact)$ is set to become lower, as the operating condition shifts to higher load or higher speed, by the use of the target compression ratio calculation map as shown in FIG. 8 for instance.

Step S6 denotes a control command calculation means (detailed later) for calculating a control command (t) to the electric motor 31 that drives the variable compression ratio mechanism 9, based on the target compression ratio $\epsilon(t)$ calculated at step S2, the prescribed time Tact calculated at step S3, the predicted target compression ratio $\epsilon(t+Tact)$ calculated at step S5, and the current actual compression ratio $\epsilon r(t)$ detected by the electric motor rotation angle sensor 32. By the way, the control command (t) corresponds to the previously-discussed characteristic curve L5 of FIG. 6.

Figure 9:
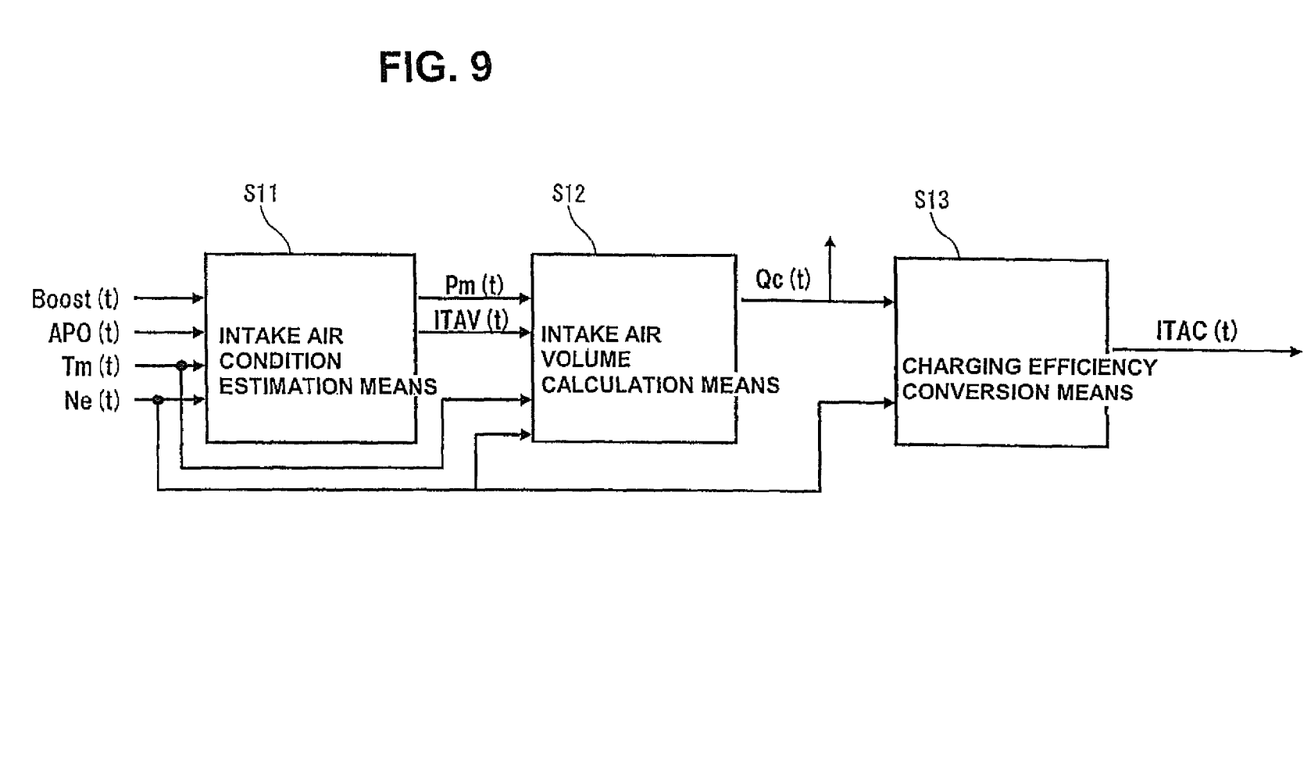
FIG. 9 is a block diagram illustrating the calculation procedure of a charging efficiency ITAC(t).

The previously-discussed charging efficiency calculation means (step S1 of FIG. 7) is hereunder described in detail, using FIG. 9.

Step S11 denotes an intake air condition estimation means for calculating an intake negative pressure estimation value Pm(t) and a volumetric efficiency estimation value ITAV(t), based on the intake air pressure Boost(t), the accelerator opening APO(t), the intake air temperature Tm(t), and the engine revolution speed Ne(t). Step S12 denotes an intake air volume calculation means for calculating the intake air volume Qc(t) drawn into the cylinder 7, based on the intake air temperature Tm(t), the engine revolution speed Ne(t), and the intake negative pressure estimation value Pm(t) and the volumetric efficiency estimation value ITAV(t) both calculated at step S11. Hereupon, assuming that the volumetric capacity of cylinder 7 is denoted by "Vc" (a fixed value), a gas constant is denoted by "R", engine revolution speed Ne(t) (unit: rpm) is unit-converted into an angular velocity ω (unit: rad/s), intake air volume Qc(t) is calculated by the following arithmetic expression (1).

[Math 1]

$$Qc(t) = \frac{\omega}{\pi} \frac{ITAV(t) Vc Pm(t)}{R Tm(t)} \quad (1)$$

Step S13 denotes a charging efficiency conversion means for calculating a charging efficiency ITAC(t), based on the engine revolution speed Ne(t) and the intake air volume Qc(t) calculated at step S12.

Figure 10:
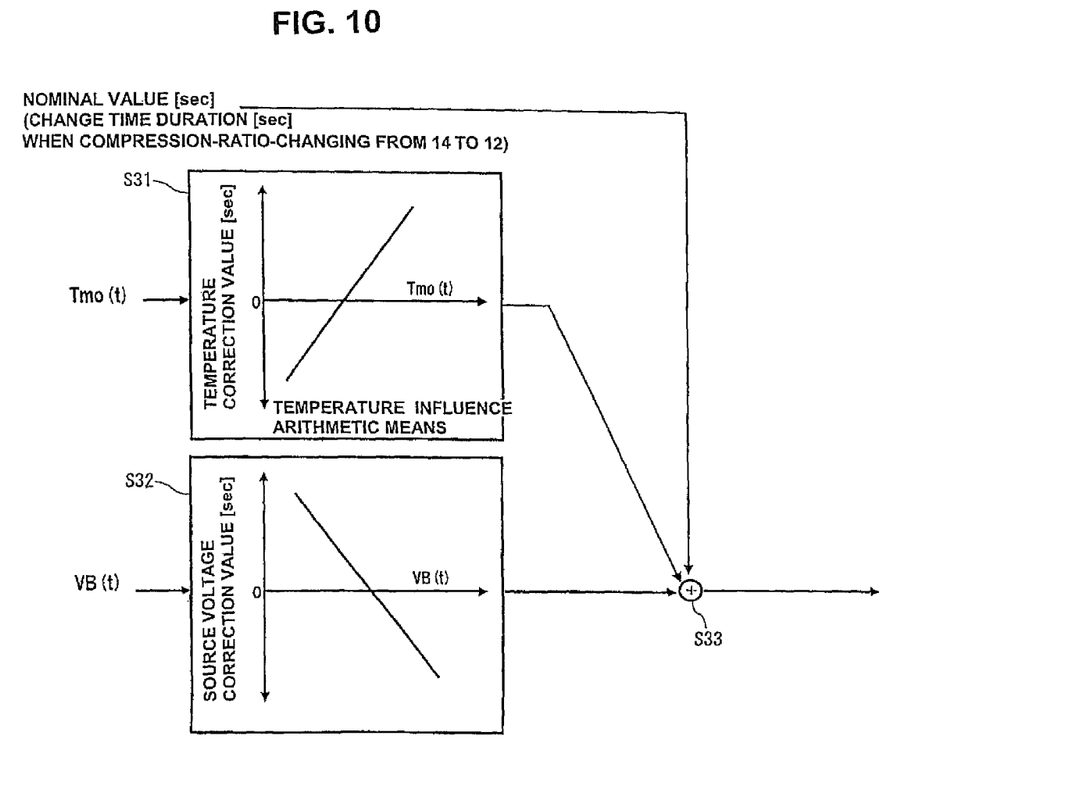
FIG. 10 is a block diagram illustrating the calculation procedure of a prescribed time Tact.

The previously-discussed prescribed time calculation means (step S3 of FIG. 7) is hereunder described in detail, using FIG. 10.

The responsiveness of the electric motor 31 that drives the variable compression ratio mechanism 9 is affected by the temperature condition of electric motor 31 and the source voltage of electric motor 31. Therefore, the prescribed time Tact corresponding to a response time of variable compression ratio mechanism 9 is calculated by correcting its nominal value (a fixed value), based on the temperature of electric motor 31 and the source voltage of electric motor 31. Hereupon, the above-mentioned nominal value is regarded as to be equivalent to a compression ratio change time when the compression ratio is changed due to depression of the accelerator pedal by the driver. In the shown embodiment, the nominal value is set to the time duration when the compression ratio is changed from "14" to "12" via the variable compression ratio mechanism 9 under a prescribed state.

Step S31 denotes a temperature correction value calculation means for calculating a temperature correction value based on the electric motor temperature Tmo(t), using a preset map.

For instance, the temperature correction value is set to become "0" (i.e., with no correction) when the electric motor temperature Tmo(t) is a predetermined reference temperature, and to become a positive value when the electric motor temperature Tmo(t) is higher than the predetermined reference temperature, and to become a negative value when the electric motor temperature Tmo(t) is lower than the predetermined reference temperature. The temperature correction value is calculated such that the prescribed time Tact lengthens, as the electric motor temperature Tmo(t) increases from the predetermined reference temperature. Also, the temperature correction value is calculated such that the prescribed time Tact shortens, as the electric motor temperature Tmo(t) decreases from the predetermined reference temperature. By the way, in calculating the temperature correction value, instead of using the electric motor temperature Tmo(t), the coolant temperature Tw(t) of internal combustion engine 1 may be used.

Step S32 denotes a voltage correction value calculation means for calculating a voltage correction value based on the source voltage VB(t), using a preset map. For instance, the voltage correction value is set to become "0" (i.e., with no correction) when the source voltage VB(t) is a predetermined reference voltage, and to become a negative value when the source voltage VB(t) is higher than the predetermined reference voltage, and to become a positive value when the source voltage VB(t) is lower than the predetermined reference voltage. The voltage correction value is calculated such that the prescribed time Tact shortens, as the source voltage VB(t) increases from the predetermined reference voltage. Also, the voltage correction value is calculated such that the prescribed time Tact lengthens, as the source voltage VB(t) decreases from the predetermined reference voltage.

At step S33, the nominal value, which is a fixed value, is corrected by both the temperature correction value calculated at step S31 and the voltage correction value calculated at step S32, so as to calculate the prescribed time Tact.

Figure 11:
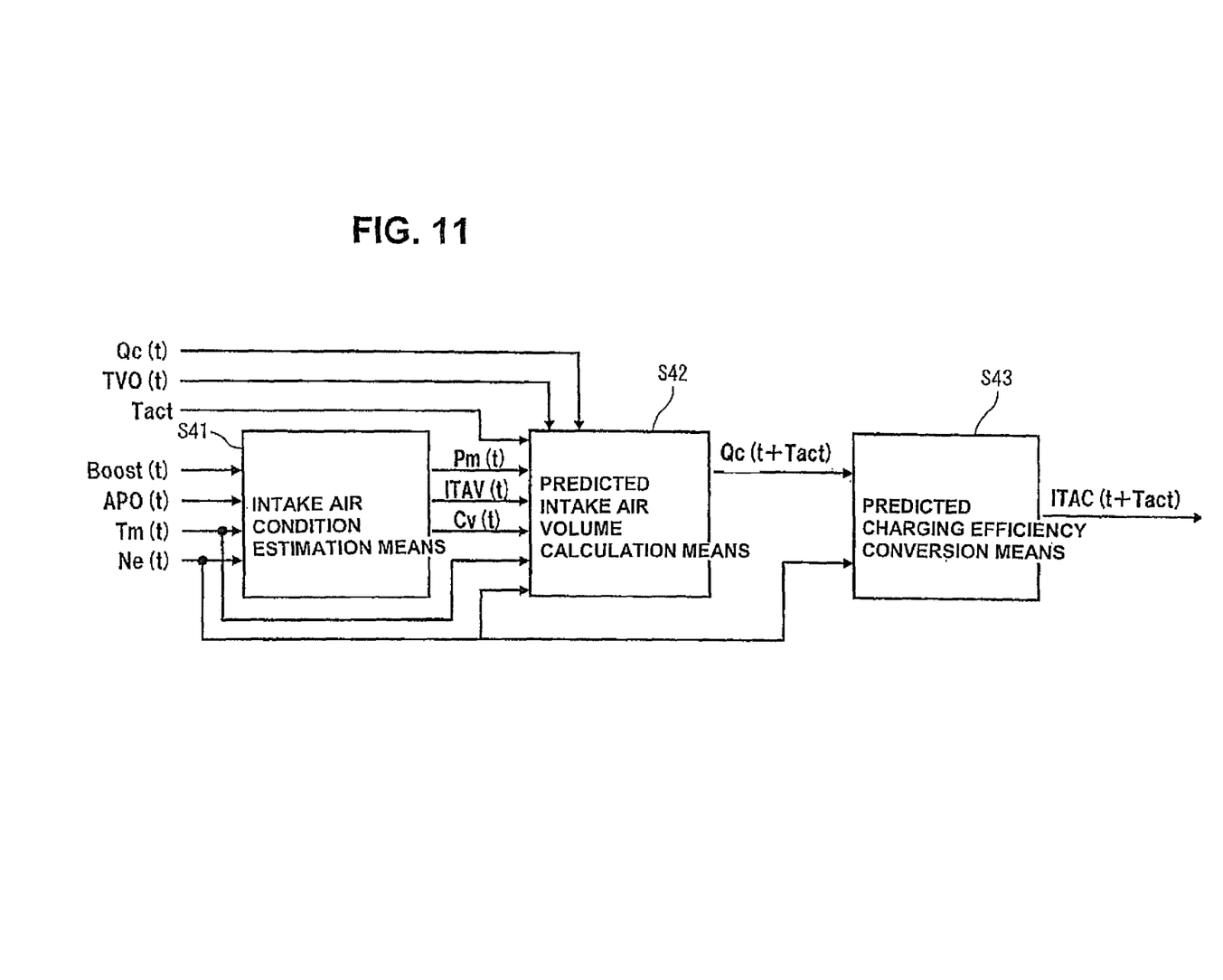
FIG. 11 is a block diagram illustrating the calculation procedure of a predicted charging efficiency ITAC (t+Tact).

The previously-discussed charging efficiency prediction means (step S4 of FIG. 7) is hereunder described in detail, using FIG. 11.

Step S41 denotes an intake air condition estimation means for calculating an intake negative pressure estimation value Pm(t), a volumetric efficiency estimation value ITAV(t), and a resistance value Cv(t), which is an intake resistance in the intake system, based on the intake air pressure Boost(t), the accelerator opening APO(t), the intake air temperature Tm(t), and the engine revolution speed Ne(t). At step S41, the intake negative pressure estimation value Pm(t), the volumetric efficiency estimation value ITAV(t), and the resistance value Cv(t) are calculated such that the intake air pressure Boost(t) and the intake negative pressure estimation value Pm(t) become identical to each other, using a general intake-system physical model. By the way, the intake air pressure Boost(t) may be outputted from step S41 to step S42 in place of the intake negative pressure estimation value Pm(t).

Step S42 denotes a predicted intake air volume calculation means for calculating a predicted intake air volume Qc(t+Tact) drawn into the cylinder 7 after expiration of the prescribed time Tact from the current point of time, based on the throttle opening TVO(t), the intake air temperature Tm(t), the engine revolution speed Ne(t), the intake air volume Qc(t) calculated at step S1, the prescribed time Tact calculated at step S3, the intake negative pressure estimation value Pm(t) and volumetric efficiency estimation value ITAV(t) and resistance value Cv(t) calculated at step S41, using a general physical model.

Step S43 denotes a predicted charging efficiency conversion means for calculating a predicted charging efficiency ITAC(t+Tact) after expiration of the prescribed time Tact from the current point of time, based on the engine revolution speed Ne(t), the predicted intake air volume Qc(t+Tact) calculated at step S42.

Figure 12:
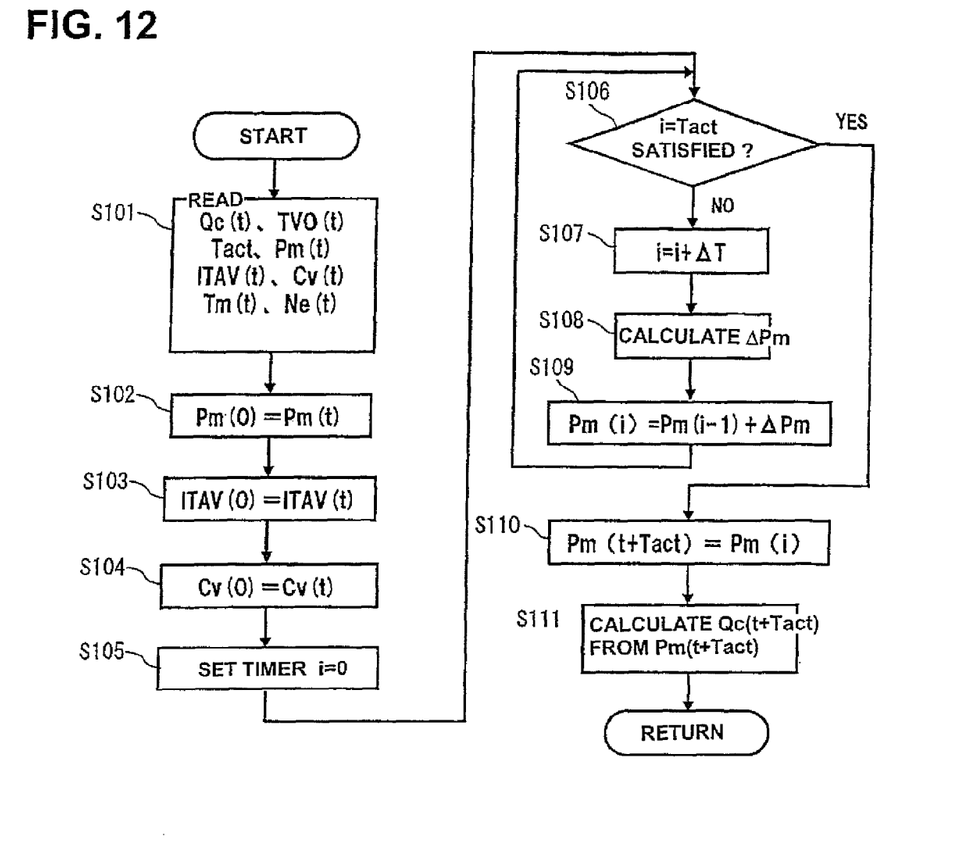
FIG. 12 is a flowchart illustrating the calculation procedure of a predicted intake air volume Qc (t+Tact).

The previously-discussed predicted intake air volume calculation means (step S42 of FIG. 11) is hereunder described in detail, using FIG. 12.

At step S101, intake air volume Qc(t), throttle opening TVO(t), prescribed time Tact, intake negative pressure estimation value Pm(t), volumetric efficiency estimation value ITAV(t), resistance value Cv(t), intake air temperature Tm(t), and engine revolution speed Ne(t) are read.

At step S102, an initial value of the intake negative pressure estimation value is set as Pm(t). At step S103, an initial value ITAV(0) of the volumetric efficiency estimation value is set as ITAV(t). At step S104, an initial value of the resistance value Cv(0) is set as Cv(t). At step S105, an initial value of the time I is set as "0".

At step S106, a check is made to determine whether the time "i" reaches the prescribed time Tact. When the time "i" does not reach the prescribed time Tact, the routine proceeds to step S107. Conversely when the time "i" reaches the prescribed time Tact, the routine proceeds to step S110. At step S107, the time is incremented or counted up by a time ΔT, which is a fixed value, and then the routine proceeds to step S108.

At step S108, a value ΔPm is calculated. Assuming that the volumetric capacity of intake air collector 12 is denoted by "Vm", a gas constant is denoted by "R", and a throttle passing intake air volume is denoted by "Qt", the value ΔPm is calculated by the following arithmetic expression (2).

[Math 2]
$$\Delta Pm = \frac{RTm(t)}{Vm}(Qt - Qc(t))\Delta T \quad (2)$$

By the way, assuming that atmospheric pressure is denoted by "P0" and a throttle opening area calculated from throttle opening TVO(t) is denoted by "A(t)", the throttle passing intake air volume Qt in the above expression (2) is calculated by the following arithmetic expression (3).

[Math 3]
$$Qt = \frac{P0}{\sqrt{(RTm(t))}}Cv(t)A(t)\theta(t) \quad (3)$$

Furthermore, assuming that a specific heat ratio is denoted by "k" and an adaptation value is denoted by "Const", the value θ(t) in the above expression (3) is represented by the following arithmetic expressions (4) and (5).

[Math 4]
$$\text{When } \frac{Pm(t)}{P0} > Const \, \theta(t) = \sqrt{\left[\frac{2k}{k-1}\left\{\left(\frac{Pm(t)}{P0}\right)^{\frac{2}{k}} - \left(\frac{Pm(t)}{P0}\right)^{\frac{k+1}{k}}\right\}\right]} \quad (4)$$

[Math 5]
$$\text{When } \frac{Pm(t)}{P0} \leq Const \, \theta(t) = 0.685 \quad (5)$$

At step S109, the intake negative pressure estimation value Pm(i) after the time "i" has expired is set as the summed value obtained by adding the value ΔPm currently calculated at step S108 to the previous value Pm(i−1), and then the routine proceeds to step S106.

At step S110, an intake negative pressure estimation value Pm(t+Tact) after expiration of the prescribed time Tact from the current point of time is set as the latest up-to-date intake negative pressure estimation value Pm(i) calculated at step S109, and then the routine proceeds to step S111.

At step S111, a predicted intake air volume Qc(t+Tact) after expiration of the prescribed time Tact from the current point of time is calculated from the intake negative pressure estimation value Pm(t+Tact) calculated at step S110.

Figure 13:
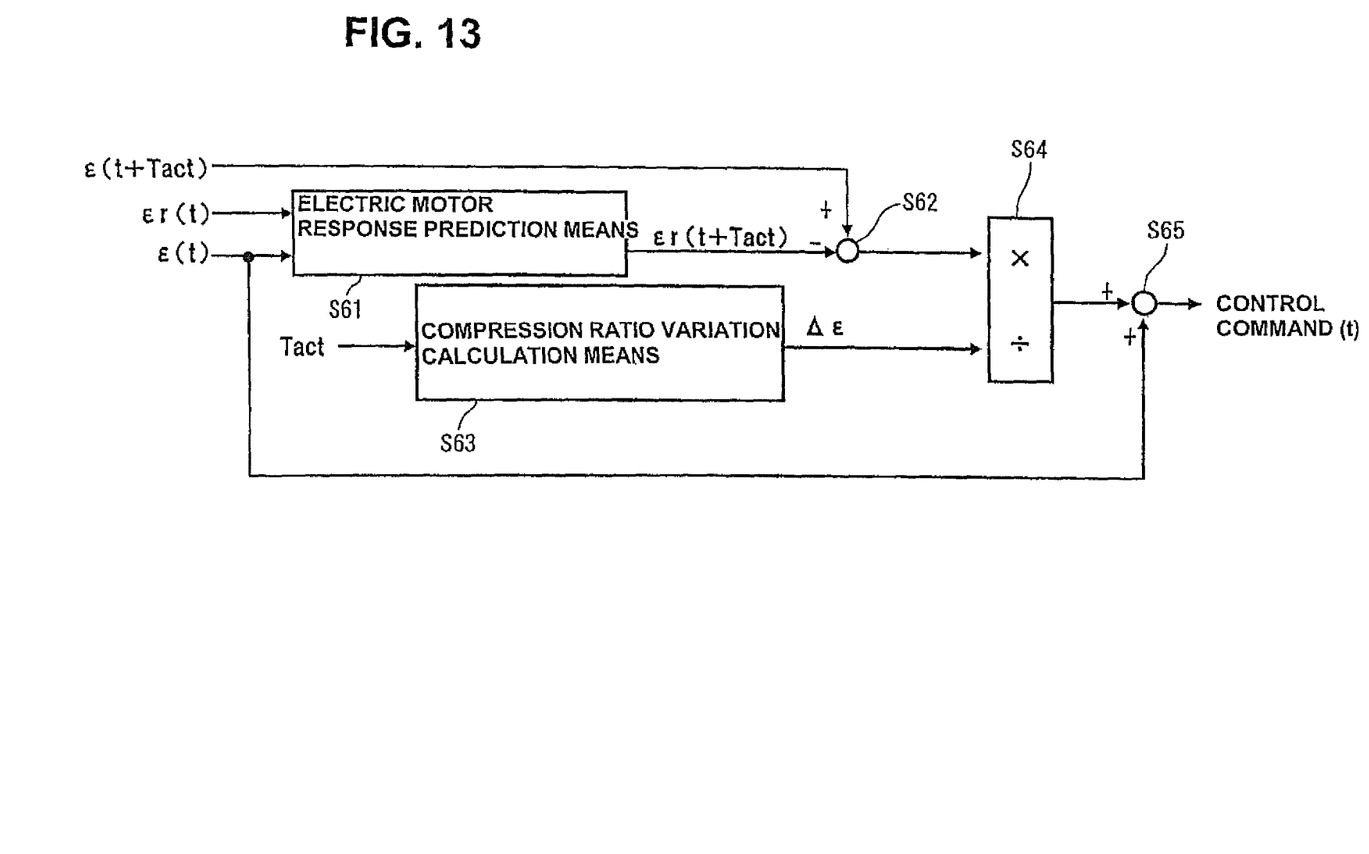
FIG. 13 is a block diagram illustrating the calculation procedure of a control command (t).

The previously-discussed control command calculation means (step S6 of FIG. 7) is hereunder described in detail, using FIG. 13.

Step S61 denotes an electric motor response prediction means for calculating an actual compression ratio εr(t+Tact) after expiration of the prescribed time Tact from the current point of time, based on the current actual compression ratio εr(t) detected by the electric motor rotation angle sensor 32 and the target compression ratio ε(t) calculated at step S2, using a general physical model.

At step S62, the result of subtraction obtained by subtracting the actual compression ratio εr(t+Tact) calculated at step S61 from the predicted target compression ratio ε(t+Tact) calculated at step S5 is outputted to step S64.

At step S63, a transient compression ratio variation Δε is calculated, using the prescribed time Tact calculated at step S3. For instance, in the case of variable compression ratio mechanism 9 configured to change the compression ratio from "14" to "8", the compression ratio variation Δε can be calculated by computing how much the compression ratio after the prescribed time (Tact) has changed when stepwise-switching the compression ratio that is a target value toward "8" from a state where the actual compression ratio is "14".

Figure 14:
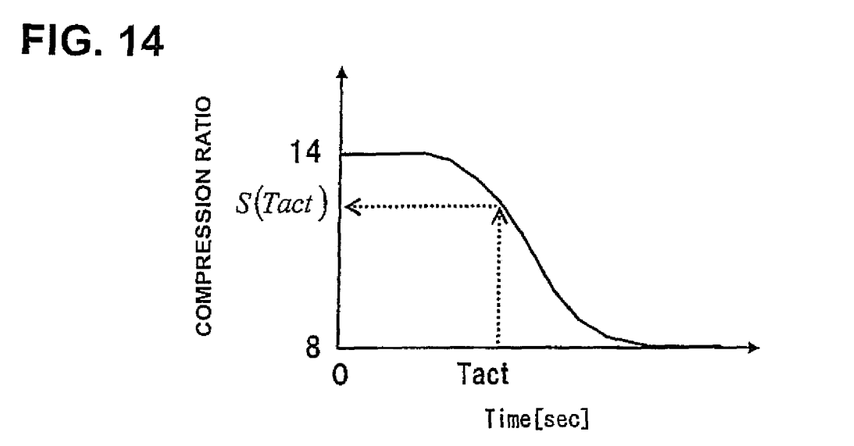
FIG. 14 is an explanatory view illustrating one example of a compression ratio response diagram.

Concretely, the compression ratio variation Δε can be calculated by the use of the compression ratio response diagram as shown in FIG. 14. FIG. 14 shows a change in the compression ratio changed via the variable compression ratio mechanism 9 when stepwise-switching the compression ratio that is a target value toward "8" from a state where the actual compression ratio is "14". The compression ratio after expiration of the prescribed time (Tact) from the time when stepwise-switching of a target value of the compression ratio toward "8" has initiated is "S(Tact)". The compression ratio variation Δε that is a reference value of the operating quantity of the variable compression ratio mechanism can be calculated by subtracting "S(Tact)" from "14" (i.e., Δε=(maximum compression ratio)−S(Tact)).

At step S64, the division result obtained by dividing the output from step S62 by the compression ratio variation Δε calculated at step S63 is outputted to step S65.

At step S65, the addition result obtained by adding the output from step S64 to the target compression ratio ε(t) calculated at step S2 is outputted as a control command (t) to the electric motor 31 that drives the variable compression ratio mechanism 9.

That is to say, when variable compression ratio mechanism 9 is controlled at the current target compression ratio ε(t), the control command calculation means calculates the control command (t) to the electric motor 31, responsively to the difference between the actual compression ratio εr(t+Tact) after the prescribed time Tact and the prescribed target compression ratio ε(t+Tact) after the prescribed time Tact.

By the way, as an intake-valve side valve operating mechanism 4, a variable valve operating mechanism configured to change valve open timing and valve closure timing of intake valve 2 may be used. In this case, in calculating a predicted charging efficiency ITAC(t+Tact), information about valve open timing and valve closure timing of intake valve 2 is also needed, and hence the information about valve open timing and valve closure timing of intake valve 2 has to be inputted to the previously-discussed charging efficiency prediction means (step S4 of FIG. 7).

In the foregoing embodiment, in calculating the predicted intake air volume Qc(t+Tact) or the intake air volume Qc(t), throttle opening TVO(t) (or accelerator opening) is used. The predicted intake air volume Qc(t+Tact) or the intake air volume Qc(t) may be calculated based on a detection value detected by in-collector pressure sensor 25 in place of throttle opening TVO(t). In this case, intake negative pressure can be detected directly by the previously-noted sensor and thus it is possible to calculate the predicted intake air volume Qc(t+Tact) or the intake air volume Qc(t) accurately. Therefore, it is possible to calculate a control command (t) to the electric motor 31 accurately, and as a result it is possible to make the actual compression ratio to follow the target compression ratio more accurately.

The invention claimed is:

1. An internal combustion engine control device comprising:
    a variable compression ratio mechanism configured to change a compression ratio of an internal combustion engine;
    a predicted intake air volume calculation means for calculating, based on an engine load of the internal combustion engine, a predicted intake air volume drawn into a cylinder after a prescribed time has expired from a current point of time, the prescribed time being a time greater than or equal to a response delay time of the variable compression ratio mechanism;
    a target compression ratio calculation means for calculating, based on the predicted intake air volume calculated by the predicted intake air volume calculation means, a predicted target compression ratio after expiration of the prescribed time from the current point of time; and
    a control command calculation means for calculating a control command to the variable compression ratio mechanism so as to bring an actual compression ratio into accordance with the predicted target compression ratio.

2. The internal combustion engine control device as recited in claim 1, wherein:
    the engine load is calculated based on an accelerator opening.

3. The internal combustion engine control device as recited in claim 1, wherein:
    the prescribed time is a time longer than the response delay time of the variable compression ratio mechanism.

4. The internal combustion engine control device as recited in claim 1, wherein:
    the predicted intake air volume is calculated based on at least one of a current accelerator opening or a current intake negative pressure.

5. The internal combustion engine control device as recited in claim 1, wherein:
    the predicted target compression ratio is set to a compression ratio such that abnormal combustion can be prevented from occurring for the predicted intake air volume.

6. The internal combustion engine control device as recited in claim 1, further comprising:
    an electric motor that drives the variable compression ratio mechanism,
    wherein the prescribed time is corrected depending on a condition of the electric motor.

7. The internal combustion engine control device as recited in claim 6, wherein:
    the prescribed time is corrected depending on a temperature condition of the electric motor.

8. The internal combustion engine control device as recited in claim 6, wherein:
    the prescribed time is corrected depending on a condition of a source voltage of the electric motor.

9. A control method of an internal combustion engine equipped with a variable compression ratio mechanism configured to change a compression ratio of the internal combustion engine, comprising:
    calculating, based on an engine load of the internal combustion engine, a predicted intake air volume drawn into a cylinder after a prescribed time has expired from a current point of time, the prescribed time being a time greater than or equal to a response delay time of the variable compression ratio mechanism;
    calculating, based on the predicted intake air volume, a predicted target compression ratio after expiration of the prescribed time from the current point of time;
    calculating a control command to the variable compression ratio mechanism so as to bring an actual compression ratio into accordance with the predicted target compression ratio; and
    controlling the variable compression ratio mechanism based on the control command.

\* \* \* \* \*